United States Patent
Baek et al.

(10) Patent No.: US 10,417,736 B2
(45) Date of Patent: Sep. 17, 2019

(54) GRAPHICS PROCESSING UNIT AND METHOD OF CONTROLLING CACHE BYPASS THEREOF

(71) Applicant: SAMSUNG ELECTRONICS CO., LTD., Suwon-si, Gyeonggi-do (KR)

(72) Inventors: Seungcheol Baek, Seoul (KR); Kwontaek Kwon, Hwaseong-si (KR)

(73) Assignee: SAMSUNG ELECTRONICS CO., LTD., Suwon-si, Gyeonggi-Do (KR)

( * ) Notice: Subject to any disclaimer, the term of this patent is extended or adjusted under 35 U.S.C. 154(b) by 16 days.

(21) Appl. No.: 15/591,571

(22) Filed: May 10, 2017

(65) Prior Publication Data
US 2017/0330304 A1    Nov. 16, 2017

(30) Foreign Application Priority Data
May 11, 2016    (KR) .................. 10-2016-0057805

(51) Int. Cl.
| | |
|---|---|
| *G06T 1/60* | (2006.01) |
| *G06T 15/04* | (2011.01) |
| *G06T 1/20* | (2006.01) |
| *G06F 12/0888* | (2016.01) |
| *G06F 9/38* | (2018.01) |

(52) U.S. Cl.
CPC ............... *G06T 1/60* (2013.01); *G06F 9/38* (2013.01); *G06F 12/0888* (2013.01); *G06T 1/20* (2013.01); *G06T 15/04* (2013.01)

(58) Field of Classification Search
CPC ............... G06F 12/0875; G09G 2360/121
See application file for complete search history.

(56) References Cited

U.S. PATENT DOCUMENTS

| | | | |
|---|---|---|---|
| 4,413,317 A | * | 11/1983 | Swenson ............... G06F 3/0601 710/38 |
| 7,228,388 B2 | | 6/2007 | Hu et al. |
| 7,890,699 B2 | | 2/2011 | Comparan et al. |
| 8,103,822 B2 | | 1/2012 | Mosek et al. |

(Continued)

FOREIGN PATENT DOCUMENTS

| | | |
|---|---|---|
| JP | 4673353 | 1/2011 |
| KR | 100798020 | 1/2008 |

(Continued)

OTHER PUBLICATIONS

Yijie Huangfu, et al., "Profiling-based L1 data cache bypassing to improve GPU performance and energy efficiency", ACM SIGBED Review—Special Issue on the 6th International Workshop on Compositional Theory and Technology for Real-Time Embedded Systems, 7-11, Feb. 1, 2015.

(Continued)

*Primary Examiner* — Phi Hoang
(74) *Attorney, Agent, or Firm* — F. Chau & Associates, LLC

(57) ABSTRACT

A control device for cache bypass includes: an information acquirer configured to acquire information about pixels on a screen space and a texture to be mapped to the pixels; and a controller configured to determine a scale factor, by using the acquired information, and to control texture data corresponding to the texture to bypass a cache based on the scale factor, wherein the scale factor is a ratio of a size of the texture to a size of the pixels.

16 Claims, 11 Drawing Sheets

(56) References Cited

U.S. PATENT DOCUMENTS

| | | | |
|---|---|---|---|
| 8,683,139 B2 | 3/2014 | Gaither et al. | |
| 9,405,696 B2 | 8/2016 | Gaither et al. | |
| 2011/0072213 A1* | 3/2011 | Nickolls | G06F 12/0862 711/122 |
| 2012/0069029 A1* | 3/2012 | Bourd | G06F 9/546 345/502 |
| 2012/0102269 A1* | 4/2012 | Ono | G06F 12/0862 711/122 |
| 2012/0151149 A1* | 6/2012 | Dubrovin | G06F 12/0862 711/133 |
| 2015/0042650 A1 | 2/2015 | Kim et al. | |
| 2015/0221063 A1 | 8/2015 | Kim et al. | |
| 2015/0370715 A1* | 12/2015 | Samanta | G06F 12/0891 711/113 |
| 2016/0041914 A1 | 2/2016 | Eckert et al. | |
| 2016/0087241 A1 | 3/2016 | Kim | |
| 2017/0061570 A1* | 3/2017 | Avkarogullari | G06T 1/20 |

FOREIGN PATENT DOCUMENTS

| | | |
|---|---|---|
| KR | 101201922 | 11/2012 |
| KR | 1020150018953 | 2/2015 |
| KR | 1020150092440 | 8/2015 |

OTHER PUBLICATIONS

Chao Li, et al., "Locality-driven Dynamic GPU Cache Bypassing", Proceedings of the 29th ACM on International Conference on Supercomputing, 67-77, May 8, 2015.

Xiaolong Xie, et al., "Coordinated static and dynamic cache bypassing for GPUs", High Performance Computer Architecture (HPCA), 2015 IEEE 21st International Symposium on, 76-88, Feb. 7, 2015.

Yingying Tian, et al., "Adaptive GPU cache bypassing", GPGPU-8 Proceedings of the 8th Workshop on General Purpose Processing using GPUs, 25-35, Feb. 7, 2015.

Xuhao Chen, et al., "Adaptive Cache Management for Energy-efficient GPU Computing", MICRO-47 Proceedings of the 47th Annual IEEE/ACM International Symposium on Microarchitecture, 343-355, Dec. 13, 2014.

Michael Doggett, "Texture Caches", IEEE Micro 32 (3), May-Jun. 2012.

* cited by examiner

GRAPHICS PROCESSING UNIT AND METHOD OF CONTROLLING CACHE BYPASS THEREOF

CROSS-REFERENCE TO RELATED APPLICATIONS

This application claims the benefit under 35 USC 119(a) of Korean Patent Application No. 10-2016-0057805, filed on May 11, 2016 in the Korean Intellectual Property Office, the entire disclosure of which is incorporated herein by reference for all purposes.

BACKGROUND

1. Field

The following description relates to graphics processing units (GPUs) and methods of controlling a cache bypass in a GPU.

2. Description of Related Art

Generally, a processing unit (or "processor"), such as a central processing unit (CPU) or a graphics processing unit (GPU), processes a command or data stored in a large capacity external memory. Since the processing velocity of a large capacity external memory is very low compared to a processor, a cache is used to increase a speed of an operation performed by the processor.

A cache stores data recently accessed by the processor, and thus, when the processor re-requests the same data, the cache allows the processor to access the cache at high speed without the need to access the external memory, thereby increasing a data transmission speed.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, control device for cache bypass includes: an information acquirer configured to acquire information about pixels on a screen space and a texture to be mapped to the pixels; and a controller configured to determine a scale factor, by using the acquired information, and to control texture data corresponding to the texture to bypass a cache based on the scale factor, wherein the scale factor is a ratio of a size of the texture to a size of the pixels.

The controller may be configured to control the texture data to bypass the cache, in response to the scale factor being determined to be equal to or greater than a critical value by comparing the scale factor to the critical value.

The controller may be configured to, in response to the scale factor being determined to be less than the critical value by comparing the scale factor to the critical value: set a counter in each cache line among cache lines in the cache; and determine, through a value of the counter, a cache line in which stored texture data is to be replaced.

The cache may include one or any combination of two or more of a texture cache, a level 1 cache, and a level 2 cache.

The information acquirer may be configured to acquire the information about the pixels on the screen space and the texture to be mapped to the pixels from one of a device driver and a texture processor.

The information acquirer may be further configured to acquire information indicating a state in which a mipmap is not prepared. The controller may be further configured to control the texture data to bypass the cache, in response to the acquired information indicating the state in which the mipmap is not prepared.

In another general aspect, a graphics processing unit (GPU) includes: an upper level cache; a lower level cache; a controller configured to control texture data transmitted from the lower level cache to bypass the upper level cache based on a scale factor; and a texture processor configured to process the texture data, wherein the scale factor is a ratio of a size of a texture to be mapped to pixels on a screen space to a size of the pixels.

The controller may be configured to control the texture data to bypass the upper level cache, in response to the scale factor being determined to be equal to or greater than a critical value by comparing the scale factor to the critical value.

The controller may be included in one of the upper level cache and the texture processor.

The controller may be configured to: control a request for the texture data to be directly transmitted to the lower level cache from the texture processor; and control the texture data to bypass the upper level cache when the texture data is transmitted from the lower level cache, in response to the request.

The upper level cache may include one or both of a texture cache and a level 1 cache, and the lower level cache is a level 2 cache.

In another general aspect, a method of controlling cache bypass includes: acquiring information about pixels on a screen space and a texture to be mapped to the pixels; determining a scale factor by using the acquired information; and controlling texture data to bypass a cache based on the scale factor, wherein the scale factor is a ratio of a size of the texture to a size of the pixels.

The controlling of the texture data include: controlling the texture data to bypass the cache, in response to the scale factor being determined to be equal to or greater than a critical value by comparing the scale factor to the critical value.

The method may further include, in response to the scale factor being determined to be less than a critical value by comparing the scale factor to the critical value: setting a counter in each cache line among cache lines in the cache; and determining, through a value of the counter, a cache line, among the cache lines, in which stored texture data is to be replaced.

The cache may include one or any combination of two or more of a texture cache, a level 1 cache, and a level 2 cache.

The acquiring of the information may include acquiring the information from a device driver or a texture processor.

The acquiring of the information may include acquiring information indicating a state in which a mipmap is not prepared. The method may further include controlling the texture data to bypass the cache, in response to the acquired information indicating the state in which the mipmap is not prepared.

A non-transitory computer-readable medium may store instructions that, when executed by one or more processors, cause the one or more processors to perform the method.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
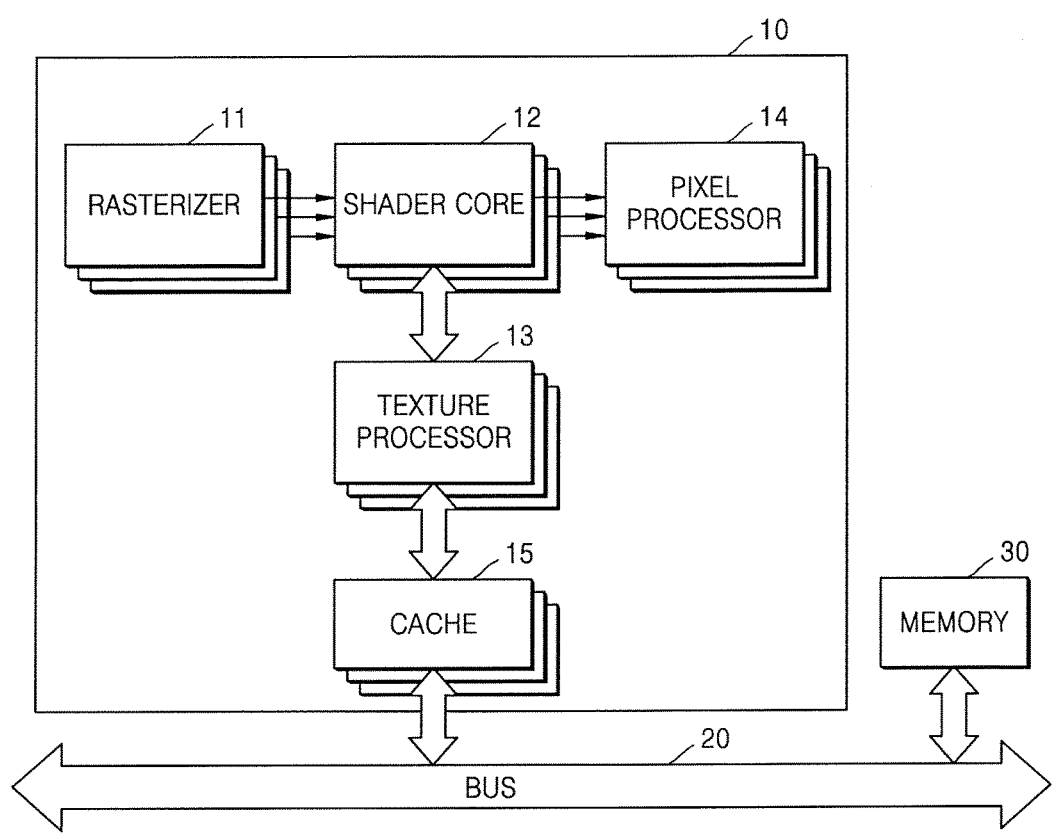
FIG. 1 is a block diagram of a graphics processing unit (GPU), according to an embodiment.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Terminologies used herein are selected as commonly used by those of ordinary skill in the art in consideration of functions of the disclosed embodiments, but may vary according to the technical intention, precedents, or a disclosure of a new technology. Also, in particular cases, some terms are arbitrarily selected by the applicant, and in this case, the meanings of the terms will be described in detail at corresponding parts of the specification. Accordingly, the terms used in the specification should be defined not by simply the names of the terms but based on the meaning and contents of the whole specification.

In the descriptions of the embodiments, it will be understood that, when an element is referred to as being connected to another element, it may include electrically connected when the element is directly connected to the other element and when the element is indirectly connected to the other element by intervening another element. Also, it should be understood that, when a part "comprises" or "includes" an element in the specification, unless otherwise defined, it is not excluding other elements but may further include other elements.

It will be further understood that the term "comprises" or "includes" should not be construed as necessarily including various elements and various operations described in the specification, and also should not be construed that portions of the elements or operations of the various elements and various operations may not be included or additional elements and operations may further be included.

The descriptions of the embodiments should not be interpreted as limiting the scope of right, and embodiments that are readily inferred from the detailed descriptions and embodiments by those of ordinary skill in the art will be construed as being included in the present invention.

FIG. 1 is a block diagram of a graphics processing unit (GPU), or graphics processor 10, according to an embodiment. Referring to FIG. 1, the GPU 10 includes a rasterizer 11, a shader core 12, a texture processor 13, a pixel processor 14, and a cache 15. The GPU 10 transmits data to an external memory 30 and receives data from the external memory 30, through a BUS 20. The GPU 10 is a device that processes three dimensional (3D) or two dimensional (2D) graphic data and may perform various graphics pipelines, such as an open graphic(s) library (openGL), a directX, and a compute unified device architecture (CUDA).

The shader core 12 may include a pixel shader. The shader core 12 may further include a vertex shader, or may be an integrated shader in which the vertex shader and the pixel shader are integrated. When the shader core 12 performs a vertex shader function, the shader core 12 generates a primitive indicating an object and transmits the primitive to the rasterizer 11. Also, the shader core 12 receives a rasterized primitive from the rasterizer 11 and performs pixel shading on the rasterized primitive.

The rasterizer 11 rasterizes the primitive generated by the vertex shader after a geometric transformation process is performed.

The shader core 12 performs pixel shading to determine colors of pixels generated through the rasterization. The shader core 12 uses pixel values generated by using a texture to generate stereoscopic and realistic 3D graphics in the pixel shading process.

When the shader core 12 requests the texture processor 13 to transmit a pixel value corresponding to a desired pixel, the texture processor 13 transmits a pixel value generated by processing a texture. At this point, the texture processor 13 requests data of a texture from the cache 15 to process the texture. When the data of the texture requested from the cache 15 is stored in the cache 15, the texture processor 13 processes the data related to the texture by receiving the data of the texture from the cache 15. When the data of the texture requested to the cache 15 is not stored in the cache 15, the cache 15 obtains the data of the texture by accessing the external memory 30 through the BUS 20, and then the texture processor 13 receives the data of the texture from the cache 15.

The pixel processor 14 determines a pixel display by performing various tests (for example, stencil test and depth test) with respect to each of the pixels.

Figure 2:
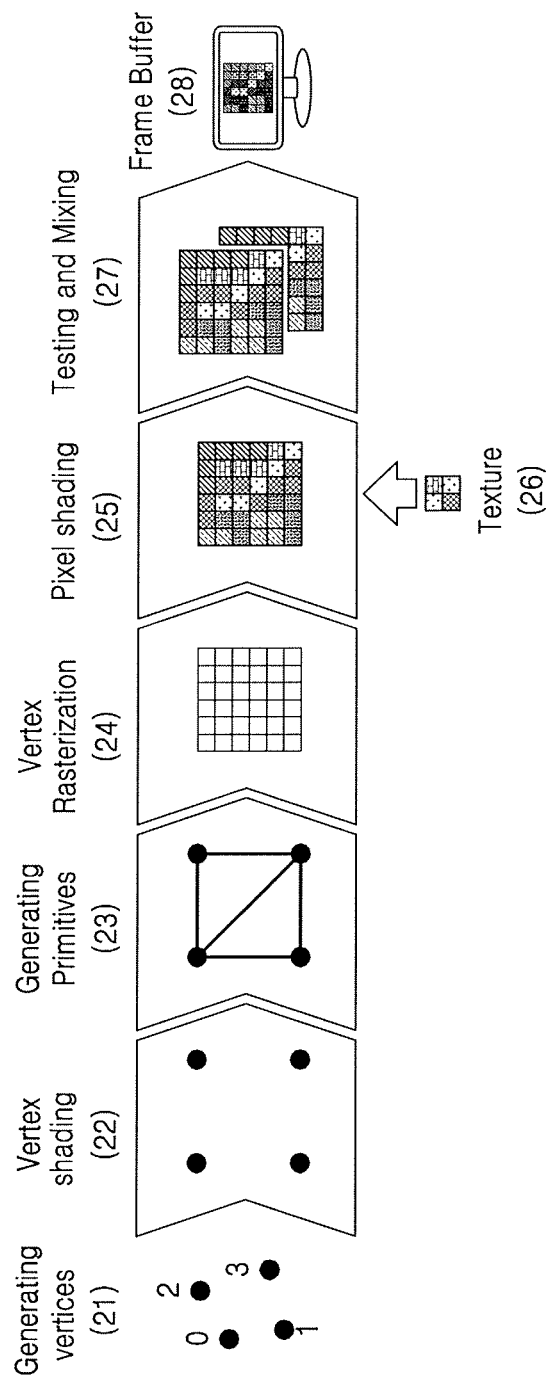
FIG. 2 illustrates a process of processing three-dimensional (3D) graphics by the GPU, according to an embodiment.

FIG. 2 illustrates a process of processing three-dimensional (3D) graphics by the GPU 10, according to an embodiment. Referring to FIG. 2, the process of processing a 3D graphics includes operation 21 through operation 27. The process of processing 3D graphics may be generally divided into three operations of geometric transformation, rasterization, and pixel shading, and will now be described by dividing the process of processing 3D graphics into further detailed operations.

In operation 21, vertices are generated to indicate objects included in the 3D graphics.

In operation 22, the generated vertices are shaded. The vertex shader may perform vertex shading by assigning locations of the vertices generated in operation 21.

In operation 23, primitives are generated. A primitive is, for example, a dot, a line, or a polygon formed using at least one vertex. For example, a primitive is a triangle formed by connecting three vertices.

In operation 24, primitives are rasterized. Rasterizing a primitive includes dividing the primitive into fragments. A fragment is a basic unit for performing graphics processing on a primitive. Since a primitive includes only information on vertices, a 3D graphics process is performed by generating fragments between vertices through the rasterization.

In operation 25, pixels are shaded. Fragments that form a primitive and are generated in the rasterization operation 24 may correspond to pixels on a screen space. In the art to which the process belongs, the terms "fragment" and "pixel" may be alternatively used according to circumstances. For example, a pixel shader is referred to as a fragment shader in certain circumstances. In general, a basic unit in graphics processing for forming a primitive may be referred to as a fragment, and thereafter, the basic unit in graphics processing for pixel shading and thereafter may be referred to as a pixel. In the pixel shading, values of pixels and characteristics (for example, a color of a pixel) are determined.

In operation 26, texturing is performed to determine colors of pixels. The texturing may include determining colors of pixels by using textures prepared in advance. In order to display various colors and patterns in the pixels, colors of all pixels should be calculated and determined.

For example, in order to determine colors of pixels, textures prepared in advance are used. More specifically, textures having different resolutions from each other may be prepared prior to the processing of the 3D graphics, so as to adaptively deal with the size of an object. A previously prepared texture having a different resolution than other textures is referred to as a mipmap.

In operation 27, testing and mixing are performed. More specifically, pixel values to be finally displayed are determined through a depth test, curling, and clipping.

in operation 28, a frame generated through operations 21 to 27 is stored in a frame buffer, and the frame stored in the frame buffer is displayed on a display device.

The process of processing 3D graphics described with reference to FIG. 2 is a general description, and thus, a further detailed description of the process will be within the knowledge and understanding of those of ordinary skill in the art.

Figure 3:
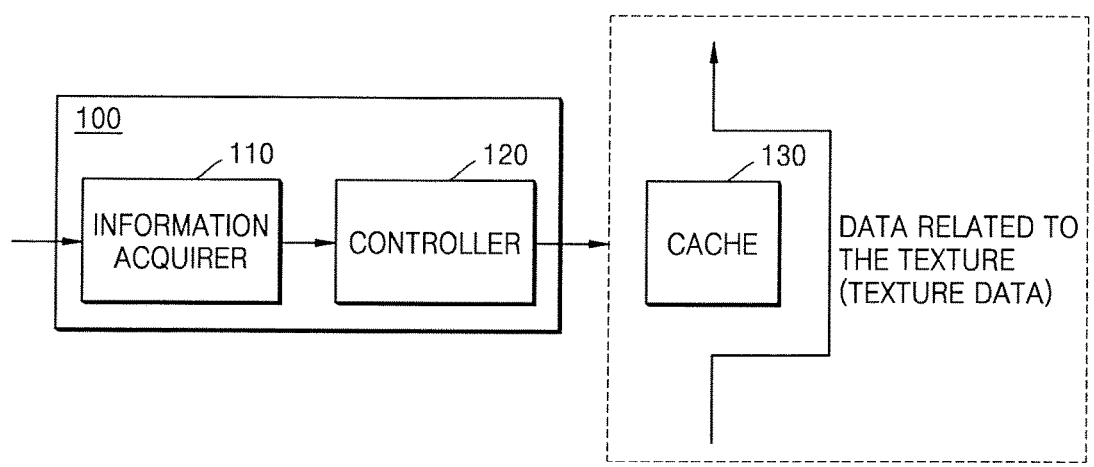
FIG. 3 is a block diagram of a control device for a cache bypass, according to an embodiment.

FIG. 3 is a block diagram of a control device 100 for a cache bypass, according to an embodiment. Referring to FIG. 3, the control device 100 includes an information acquirer 110 and a controller 120.

The information acquirer 110 acquires information about pixels on a screen space and a texture mapped to the pixels. More specifically, when an object is displayed on pixels on a screen space, the information acquirer 110 acquires information about the size of the pixels and the size of the texture mapped to the pixels. For example, the information acquirer 110 acquires information about pixel resolution and texel resolution of the texture mapped to the pixels.

Figure 4:
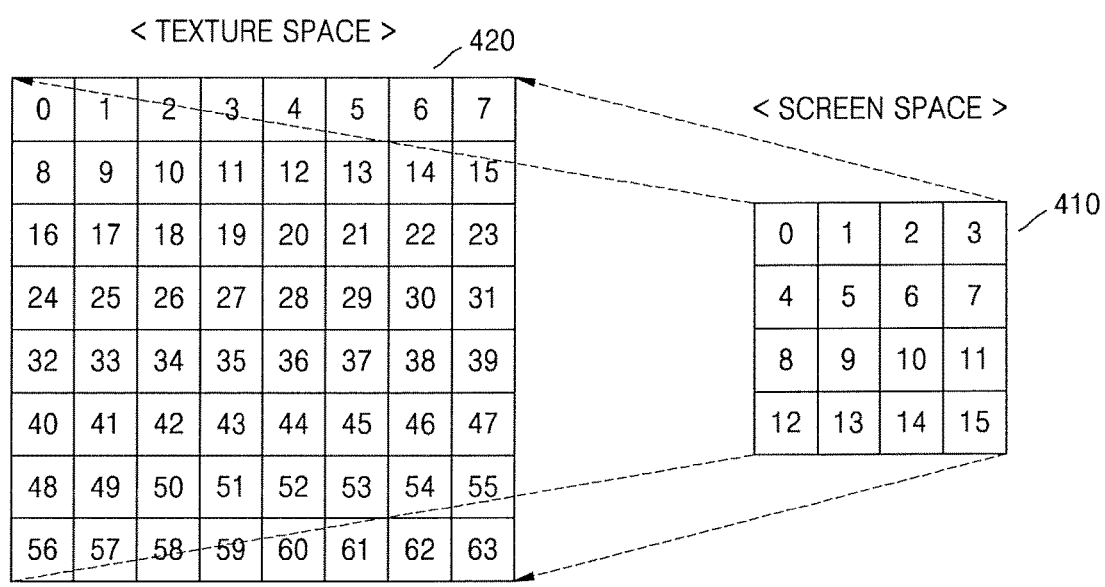
FIG. 4 is a diagram illustrating mapping of pixels and a texture, according to an embodiment.

FIG. 4 is a diagram illustrating mapping of pixels and a texture, according to an embodiment. Referring to FIG. 4, when pixels 410 are generated on a screen space by rasterization to indicate an object, a texture 420 to be mapped to the pixels 410 is determined. The texture 420 may include information with respect to a color, texture, and pattern of the object and may be defined by texture coordinates on a texture space configured of texels.

Also, referring to FIG. 4, according to an embodiment, the pixels 410 have a size of 4×4 and the texture 420 have a size of 8×8. The sizes of the pixels 410 and the texture 420 may be referred to as resolutions.

Accordingly, when the pixels 410 and the texture 420 are mapped, the pixel shader performs shading of the pixels 410 on the screen space by determining values (for example, color values) of the pixels 410 to correspond to a color, texture, and pattern of the mapped texture 420.

Referring to FIG. 3, according to an embodiment, the information acquirer 110 acquires information about pixel and texture mapped to the pixels from a device driver. For example, the information acquirer 110 acquires information about pixels and a texture from a draw command of the device driver. Also, according to another embodiment, the information acquirer 110 acquires information about pixels and a texture from the texture processor 13 that performs texturing.

The controller 120 determines a scale factor, which is a ratio of the size of the texture to the size of pixels, by using information acquired by the information acquirer 110. That is, the controller 120 calculates a scale factor which is a ratio of the size of pixels to the size of the texture to be mapped to the pixels. For example, when the pixels are configured of 4×4 resolutions and the texture is configured of 8×8 resolutions, the controller 120 determines a scale factor by using the following Equation 1.

$$\text{Scale factor} = \text{Log}_4 \frac{\text{the number of texels that constitute texture}}{\text{the number of pixels}} \qquad \text{[Equation 1]}$$

The controller 120 controls data related to the texture to bypass a cache 130 based on the determined scale factor. In other words, the controller 120 controls data related to the texture transmitted from the outside to be transmitted to an object that requested the data related to the texture, without storing the data related to the texture in the cache 130, based on the determined scale factor. For example, the controller 120 controls data related to the texture transmitted from a cache of a lower level than the cache 130 to be transmitted to a texture processor without storing the data related to the texture in the cache 130. The data related to the texture may be not only data related to the texture itself, but also all data that may be used by binding the data with the texture in a rendering process. Also, the cache 130 includes one or any combination of two or more of a texture cache, a level 1 cache, and a level 2 cache.

The controller 120 controls data related to the texture to bypass the cache 130 when the scale factor is beyond a critical value by comparing the scale factor to the critical value. For example, when the determined scale factor is more than 2, which is a critical value, the controller 120 controls the data related to the texture to bypass the cache 130, and when the determined scale factor is less than the critical value 2, the controller 120 controls the data related to the texture not to bypass the cache 130.

Figure 5:
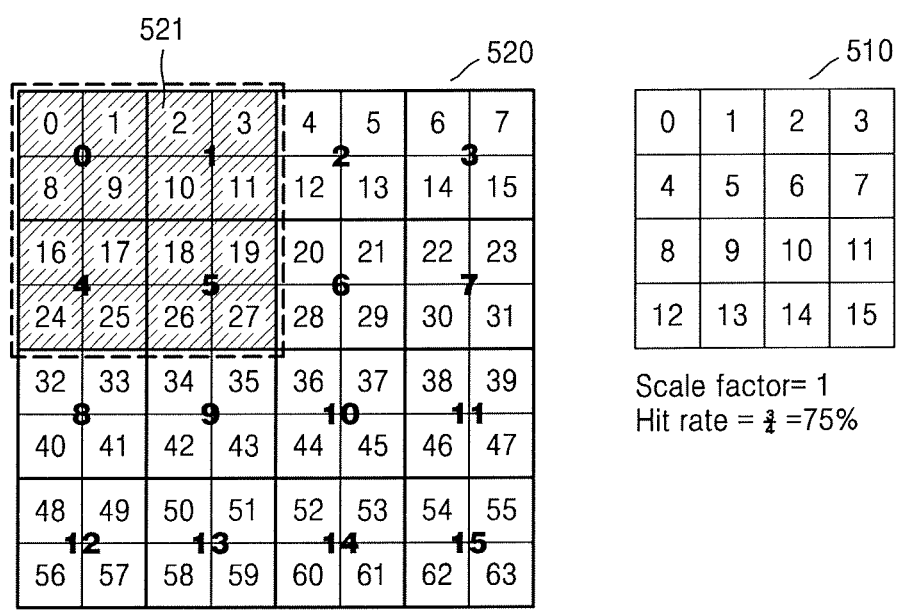
FIG. 5 is an example of controlling, by a controller, data related to a texture not to bypass a cache.

FIG. 5 is an example of controlling, by the controller 120, data related to a texture not to bypass a cache. Referring to FIG. 5, pixels 510 are mapped to a texture 520, and each of the pixels 510 are mapped to four texels in the texture 520. Also, the controller 120 determines a scale factor as 1 by using Equation 1.

When the scale factor is 1, a cache hit rate with respect to data related to the texture may be determined as 75%. In detail, in a case when 16 data related to the texture are able to be stored in each cache line, for primarily rendering (for example, pixel shading) with respect to pixel 0, data related to texels 0, 1, 8, and 9 corresponding to the pixel 0 is requested from the cache, and after a cache miss occurs, the data related to texels 521 is stored in the cache line. Next, for rendering with respect to pixels 1, 4, and 5, data related to texels corresponding to the pixels 1, 4, and 5 is requested from the cache, and cache hits are generated 3 times. Accordingly, when the scale factor is 1, cache hits are generated 3 times with respect to the total four data requests, and thus, the cache hit rate is determined as 75%.

When the scale factor is 1, since the cache hit rate is 75%, data related to the texture may be reused without being stored in the cache. Accordingly, when the scale factor is 1, the controller 120 controls the data related to the texture to be stored in the cache without bypassing the cache.

Figure 6:
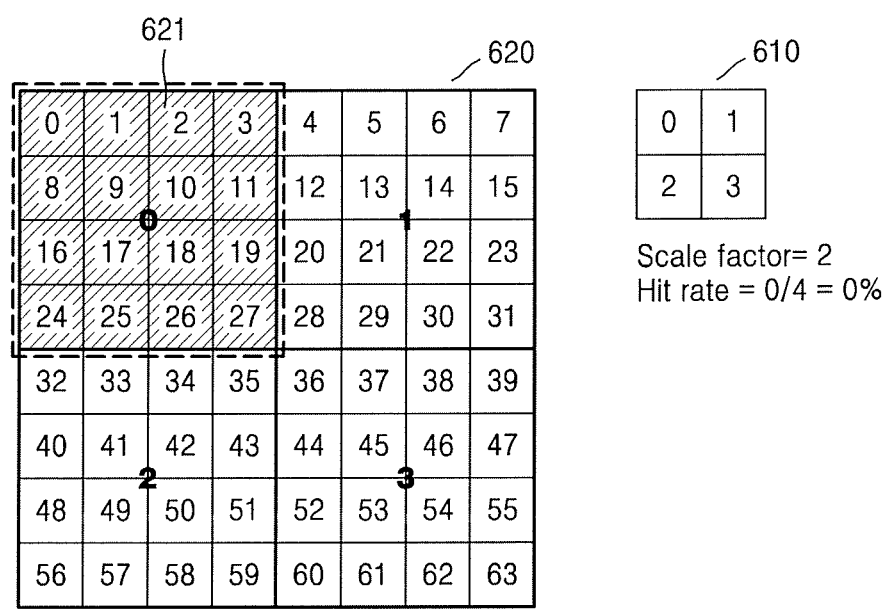
FIG. 6 is an example of controlling, by a controller, data related to a texture to bypass a cache.

FIG. 6 is an example of controlling, by the controller 120, data related to a texture to bypass a cache. Referring to FIG. 6, pixels 610 are mapped to a texture 620, and each of the pixels 610 are mapped to 16 texels in the texture 620. Also, the controller 120 determines a scale factor as 2 by using Equation 1.

When the scale factor is 2, a cache hit rate with respect to data related to the texture 620 is determined as 0%. In detail, in a case when 16 data related to the texture are able to be stored in each cache line, for primarily rendering with respect to pixel 0, data related to texels 621 corresponding to the pixel 0 is requested to the cache, and after a cache miss occurs, the data related to the texels 621 is stored in the cache line. However, for rendering with respect to other pixels 1, 2, and 3, data related to texels corresponding to the pixels 1, 2, and 3 is requested from a cache, and cache misses are generated three times. That is, after storing the data related to texels corresponding to each of the pixels 0, 1, 2, and 3 in the cache line, a case in which the data related to texels is re-used is not generated. Accordingly, when the scale factor is 2, cache hits are generated 0 times with respect to the total four data requests, and thus, the cache hit rate is determined as 0%.

When the scale factor is 2, the cache hit rate is 0%, and thus, after storing the data related to the texture in the cache, there is no possibility of reusing the data related to the texture. Accordingly, when the scale factor is 2, the controller 120 controls the data related to the texture to bypass the cache.

Accordingly, the control device 100 may reduce power consumption for read/write of unnecessary data on the cache 130 by determining the possibility of reusing the data related to a texture after storing the data related to the texture in the cache 130, and by controlling the data related to the texture to bypass the cache 130 when there is no possibility of reusing the data related to the texture. Also, the control device 100 may reduce cache pollution and cache traffic by controlling unnecessary data to bypass the cache 130.

Referring to FIG. 3 again, the information acquirer 110 obtains information indicating a state in which a mipmap is not prepared, and, when the state in which the mipmap is not prepared is indicated, the controller 120 controls the data related to the texture to bypass the cache 130. According to an embodiment, the information acquirer 110 acquires information indicating a state in which a mipmap is not prepared from a device driver, and according to another embodiment, the information acquirer 110 acquires information indicating a state in which a mipmap is not prepared from the texture processor 13.

When the controller 120 controls the data related to the texture to be stored in the cache 130 based on a scale factor, the controller 120 determines a cache line to replace the data related to the texture through a counter value after setting the counter in each cache line in the cache 130. In other words, if the scale factor is less than a critical value, the controller 120 determines a cache line in which data currently stored is replaced by data related to a new texture by using a counter value set in each cache line.

For example, as depicted in FIG. 5, when the scale factor is 1, data to be stored in a cache line for rendering with respect to the pixel 0 may be used three times for rendering the pixels 1, 4, and 5, respectively. Accordingly, if 3 cache hits are generated with respect to the cache line, the use of the data stored in the cache line is no longer needed, and the currently stored data in the cache line may need to be replaced with a new data. Accordingly, the controller 120 counts the number of cache hits generated with respect to each cache line by setting a counter with respect to each cache line in the cache 130. Also, the controller 120 determines a cache line that includes data related to a texture that is to be replaced by determining whether 3 cache hits are generated or not, through a counter value set in each cache line. According to a cache replacement policy in an embodiment, in order to count whether the generated number of cache hits is 3 times, the controller 120 allocates 2 bits to each cache line, and in order to determine whether the scale factor is 1, the controller 120 allocates 1 bit to each cache line. Also, according to a cache replacement policy in another embodiment, in order to determine whether the cache hits are generated 3 times and the scale factor is 1, the controller 120 allocates 1 bit to each cache line.

The controller 120 may determine a cache line for which data related to the texture of the cache line is to be replaced by using the algorithm of Table 1 below.

TABLE 1

```
IF (Hit)
{
   MRU(Way);
   IF(Way.LOD==1)
      Way.Reference--;
}
ELSE
{
   IF(Way.LOD==1 && Way.Reference==0)
   {
      VictimSelect(Way);
      DataStore(Way);
       Way.Reference=3;
   }
   ELSE
   {
      VictimSelect(getLRU( ));
      DataStore(Way);
      MRU(Way);
    }
}
```

The algorithm of Table 1 is based on a cache replacement policy according to a least recently used (LRU) cache. When the computation process of the algorithm of Table 1 is reviewed, when a cache hit is generated with respect to a cache line, and when a scale factor (LOD) corresponding to the cache line with respect to which a cache hit is generated, the controller 120 reduces a count value corresponding to the cache line.

Also, when a cache miss is generated with respect to a cache line, the controller 120 determines a cache line having a scale factor 1 and corresponding to a count value of 0 as the cache line for which data related to the texture of which is to be replaced. Next, the controller 120 assigns a count value of 3 to the determined cache line.

Figure 7:
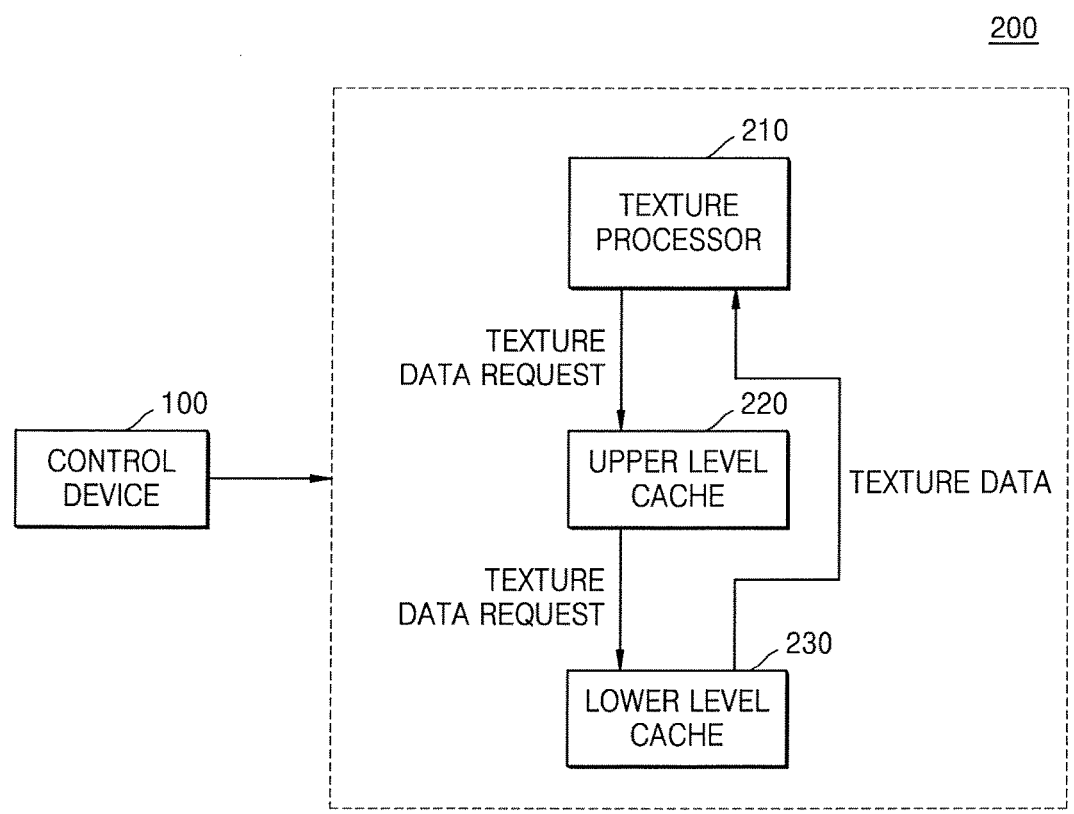
FIG. 7 is a block diagram of a GPU, according to another embodiment.

FIG. 7 is a block diagram of a graphics processing unit (GPU) 200, according to an embodiment. Referring to FIG. 7, The GPU 200 includes a texture processor 210, an upper level cache 220, a lower level cache 230, and the control device 100. The GPU 200 depicted in FIG. 7 includes elements related to an embodiment. Accordingly, it will be understood by those of ordinary skill in the art that the GPU 200 may include other general elements in addition to the elements depicted in FIG. 7. Also, the control device 100 corresponds to the control device 100 of FIG. 3, and thus, descriptions of the control device 100 will not be repeated.

The upper level cache 220 and the lower level cache 230 may be a texture cache and a level 1 L1 cache, respectively. Also, according to another embodiment, the upper level cache 220 may include two or more caches, and the lower level cache 230 may be the last-level-cache. For example, the upper level cache 220 includes a texture cache and a lower level L1 cache, and the lower level cache 230 is a level 2 L2 cache.

The control device 100 controls the data related to the texture (hereinafter, texture data) transmitted from the lower level cache 230 to bypass the upper level cache 220 based on a scale factor which is a ratio of the texture to be mapped to pixels on a screen space to the pixels.

In detail, the texture processor 210 requests texture data from the upper level cache 220. If the texture data requested from the upper level cache 220 is already stored (that is, if the there is a cache hit) in the upper level cache 220, the upper level cache 220 transmits the texture data to the texture processor 210. However, if the texture data is not stored in the upper level cache 220 (that is, if there is a cache miss), the upper level cache 220 requests the lower level cache 230 to send the texture data.

Next, in response to the request of the texture data, the lower level cache 230 transmits the texture data to the upper level cache 220. When the texture data is transmitted to the upper level cache 220 from the lower level cache 230, the control device 100 controls the texture data to bypass the upper level cache 220 based on a scale factor. In other words, if the scale factor is greater than a critical value, the control device 100 controls the texture data so that the texture data is directly transmitted to the texture processor 210 from the lower level cache 230 without being stored in the upper level cache 220.

Accordingly, when it is determined that, after storing the texture data in the upper level cache 220, there is no possibility of reusing the texture data based on a scale factor that indicates the possibility of reusing the texture data, the control device 100 controls the texture data transmitted from the lower level cache 230 to bypass the upper level cache 220.

In FIG. 7, the control device 100 is depicted as being separate from the texture processor 210, the upper level cache 220, and the lower level cache 230. However, the control device 100 may be included in the texture processor 210 or the upper level cache 220. Also, the control device 100 may be included in a device driver.

The texture processor 210 processes bypassed texture data. That is, the texture processor 210 determines a pixel value by using the bypassed texture data.

Figure 8:
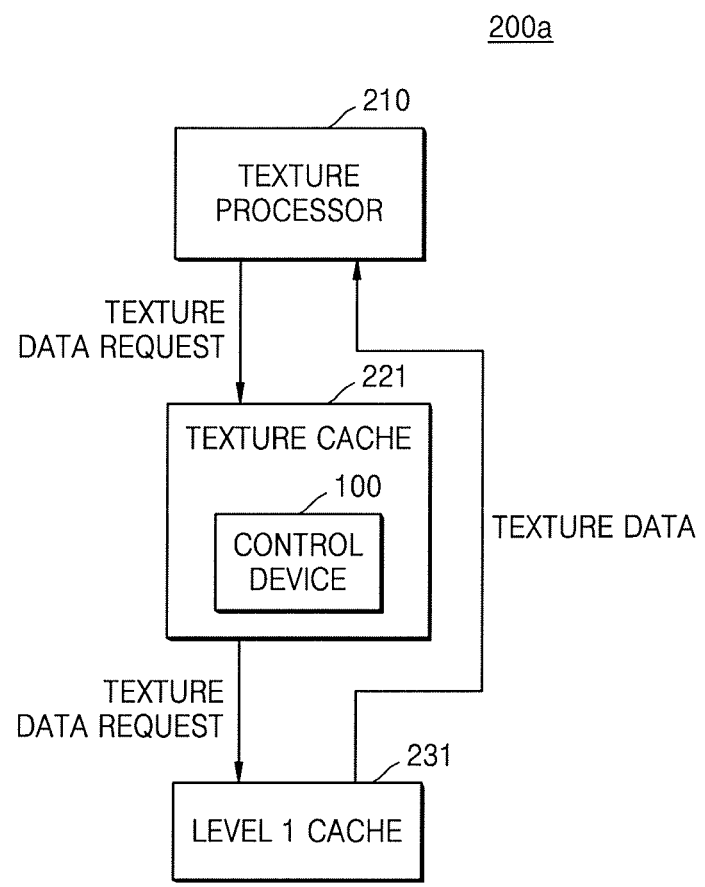
FIG. 8 is a block diagram of a GPU, according to another embodiment.

FIG. 8 is a block diagram of a GPU 200*a*, according to another embodiment. The GPU 200*a* includes the texture processor 210, the texture cache 221, and a level 1 cache L1 231. The texture cache 221 includes the control device 100.

The texture processor 210 and the control device 100 corresponds to the texture processor 210 and the control device 100 of FIG. 7, the texture cache 221 corresponds to the upper level cache 220 of FIG. 7, and the level 1 cache L1 231 corresponds to the lower level cache 230 of FIG. 7. Thus, the descriptions of these elements will not be repeated.

The texture cache 221 includes the control device 100, and determines whether to store a texture data transmitted from the level 1 cache L1 231 based on the scale factor. In detail, if the scale factor is less than a critical value, the texture cache 221 transmits the texture data to the texture processor 210 after storing the texture data transmitted from the level 1 cache L1 231 in the texture cache 221. Also, if the scale factor is greater than the critical value, the texture cache 221 controls the texture data transmitted from the level 1 cache L1 231 to bypass the texture cache 221. In other words, the texture cache 221 transmits the texture data transmitted from the level 1 cache L1 231 to the texture processor 210 without storing the texture data in the texture cache 221.

Figure 9:
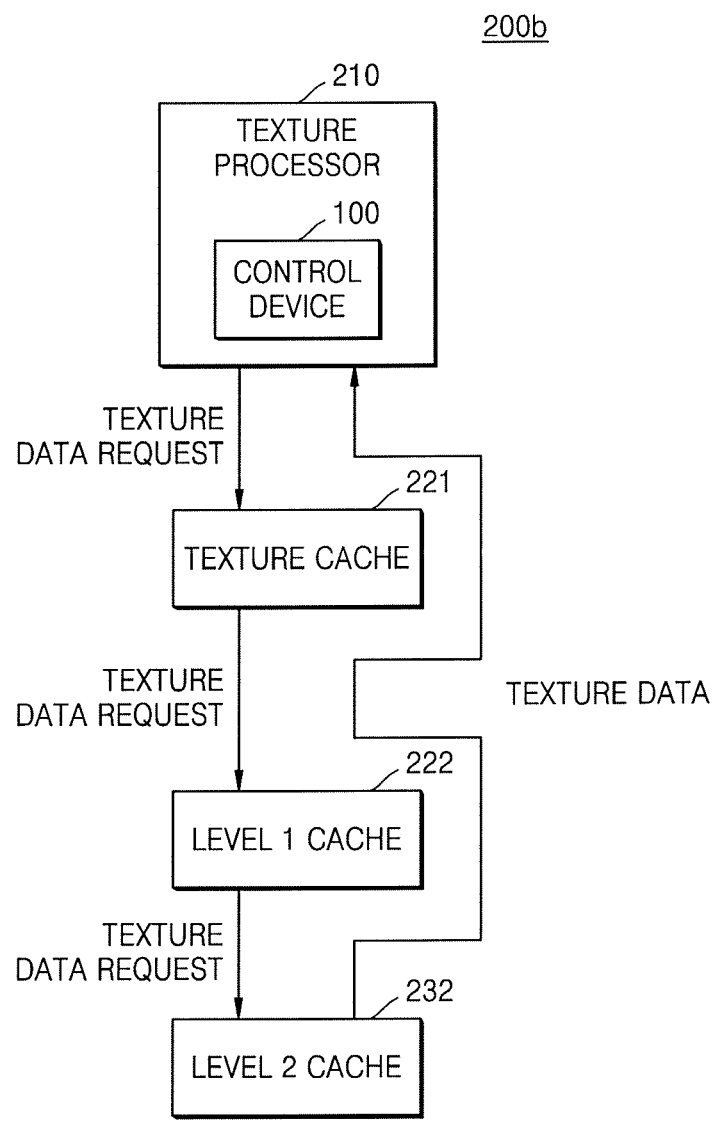
FIG. 9 is a block diagram of a GPU, according to another embodiment.

FIG. 9 is a block diagram of a GPU 200*b*, according to another embodiment. The GPU 200*b* includes the texture processor 210, the texture cache 221, a level 1 cache L1 222, and a level 2 cache L2 232. The texture processor 210 includes the control device 100.

The texture processor 210 and the control device 100 correspond to the texture processor 210 and the control device 100 of FIG. 7, the texture cache 221 and the level 1 cache L1 222 correspond to the upper level cache 220 of FIG. 7, and the level 2 cache L2 232 corresponds to the lower level cache 230 of FIG. 7. Thus, the descriptions of these elements will not be repeated.

The texture processor 210 requests the texture data from the texture cache 221. Also, the texture processor 210 transmits information that indicates whether the texture cache 221 or the level 1 cache L1 222 stores the texture data together with the request for texture data from the texture cache 221 or the level 1 cache L1 222. That is, the texture processor 210 includes the control device 100, and thus, the texture processor 210 controls the texture cache 221 or the level 1 cache L1 222 not to store the texture data if the scale factor is greater than the critical value.

Accordingly, as depicted in FIG. 9, in response to consecutive requests to the level 2 cache L2 232 for texture data, the texture processor 210 controls the texture data transmitted from the level 2 cache L2 232 to be directly transmitted to the texture processor 210 after bypassing the level 1 cache L1 222 and the texture cache 221.

Figure 10:
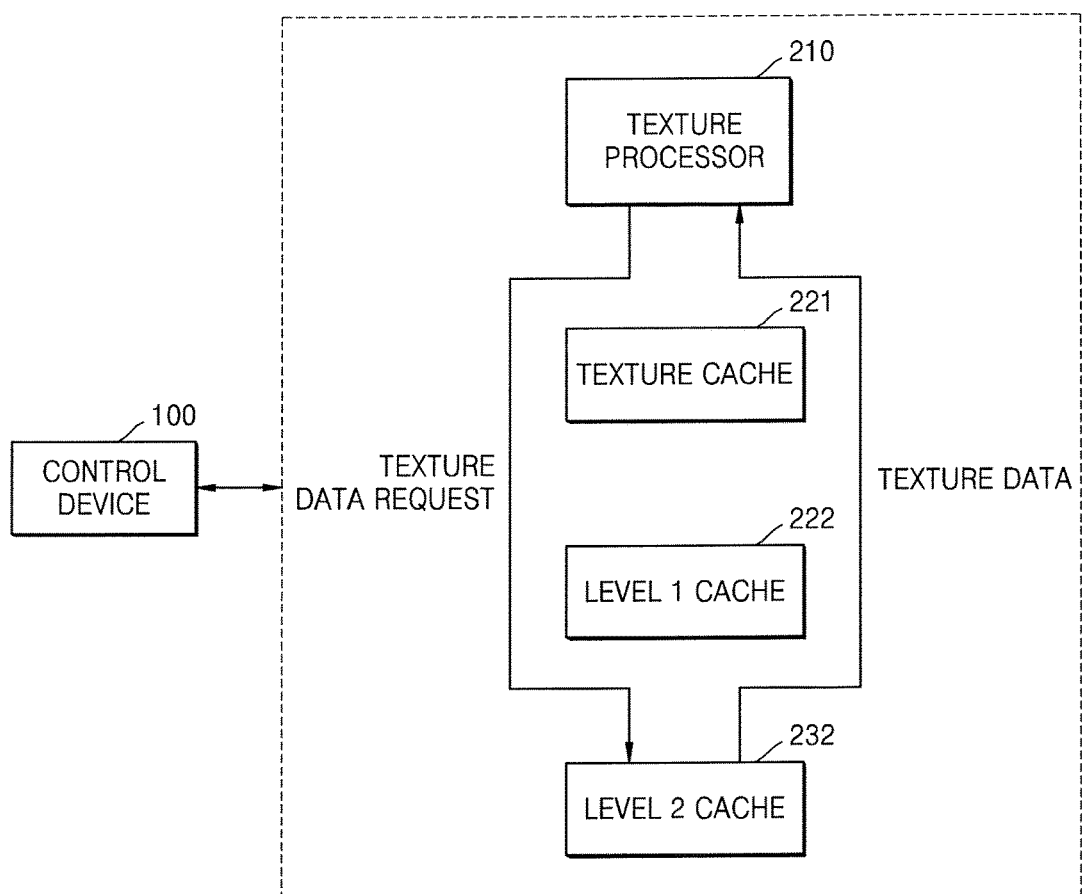
FIG. 10 is a block diagram of a GPU, according to another embodiment.

FIG. 10 is a block diagram of a GPU 200*c* according to another embodiment. The GPU 200*c* includes the texture processor 210, the texture cache 221, the level 1 cache L1 222, the level 2 cache L2 232, and the control device 100.

The texture processor 210 and the control device 100 corresponds to the texture processor 210 and the control device 100 of FIG. 7, the texture cache 221 and the level 1 cache L1 222 correspond to the upper level cache 220 of FIG. 7, and the level 2 cache L2 232 corresponds to the lower level cache 230 of FIG. 7. Therefore, the descriptions of these elements will not be repeated.

The control device 100 controls the texture processor 210 to request texture data from the level 2 cache L2 232, rather than from the texture cache 221, based on a scale factor. In other words, the control device 100 controls the texture processor 210 to directly request the texture data from the level 2 cache L2 232, which is the last level cache, without passing the request through the texture cache 221 and the level 1 cache L1 222.

Next, the control device 100 controls the texture data transmitted from the level 2 cache L2 232 to be directly transmitted to the texture processor 210 after bypassing the level 1 cache L1 222 and the texture cache 221.

Figure 11:
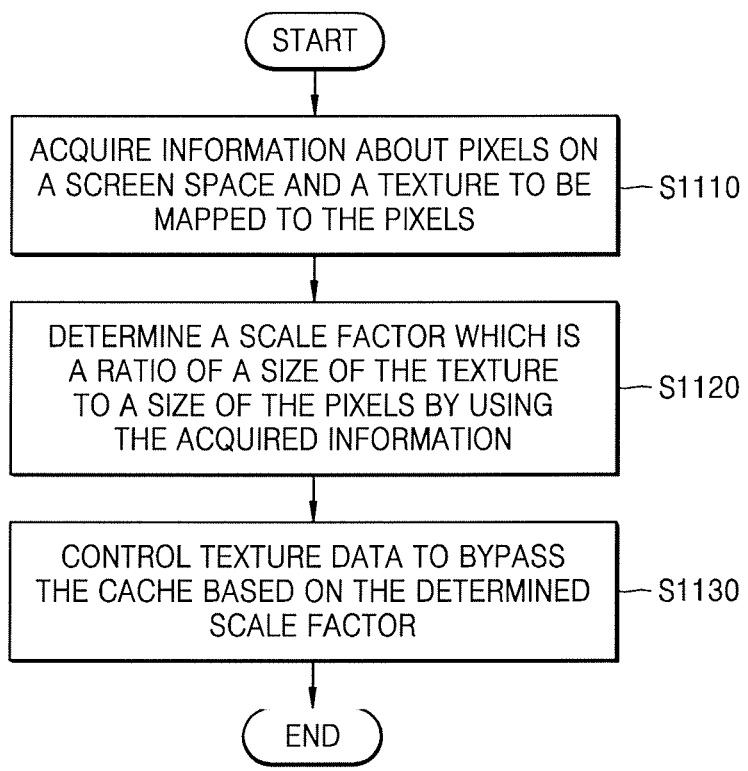
FIG. 11 is a flowchart of a method of controlling a cache bypass, according to an embodiment.

FIG. 11 is a flowchart of a method of controlling a cache bypass, according to an embodiment. The method depicted in FIG. 11 may be performed by the elements of the control device 100 of FIG. 3, and detailed descriptions of these elements will not be repeated.

Referring to FIG. 11, in operation S1110, the control device 100 acquires information about pixels on a screen space and a texture to be mapped to the pixels. In detail, when an object is displayed in the pixels of the screen space, the control device 100 acquires information about the size of pixels and the size of a texture to be mapped to the pixels. The control device 100 acquires the pixels and the texture to be mapped to the pixels from a device driver or a texture processor.

Also, the control device 100 acquires information indicating a state in which a mipmap is not prepared. The control device 100 may acquire information indicating a state in which a mipmap is not prepared from the device driver. According to another embodiment, the control device 100 may acquire information indicating a state in which a mipmap is not prepared from the texture processor.

In operation S1120, the control device 100 determines a scale factor, which is a ratio of the size of the texture to a size of the pixels, by using the information acquired in the operation S1110. That is, the control device 100 calculates the scale factor, which is a ratio of the size of the texture to be mapped to the pixels to the size of the pixels.

In operation S1130, the control device 100 controls texture data to bypass the cache 130 based on the scale factor determined in the operation S1120. The control device 100 compares the scale factor to a critical value, and if the scale factor is greater than the critical value, controls the texture data to bypass the cache 130. For example, if the determined scale factor is greater than a critical value of 2, the control device 100 controls the texture data to bypass the cache 130, and if the determined scale factor is less than the critical value of 2, the control device 100 controls the texture data not to bypass the cache 130.

Also, when the control device 100 controls the texture data to be stored in the cache 130 based on the scale factor, the control device 100 sets a counter in each cache line in the cache 130, and through the count value, determines a cache line for which the texture data of the cache line is replaced. In other words, if the scale factor is less than the critical value, the control device 100 determines a cache line in which the currently stored data is replaced with a new texture data by using the counter value in each cache line.

Also, when a mipmap is not prepared, the control device 100 controls the texture data to bypass the cache 130.

The GPUs 10, 200, 200a, 200b and 200c according to the disclosed embodiments may include a processor, a memory that stores a program data and execute it, a permanent storage, such as a disc drive, a communication port for communicating to an external device, and a user interface, such as a touch panel, a key or buttons. The GPUs 10, 200, 200a, 200b and 200c in FIGS. 1 and 7-10, respectively, the rasterizer 11, pixel processor 14, texture processor 13, cache 15, bus 20 and memory 30 in FIG. 1, the control device 100 in FIGS. 3 and 7-10, the information acquirer 110, controller 120 and cache 130 in FIG. 3, the texture processor 210 in FIGS. 7-10, the upper level cache 220 and lower level cache 230 in FIG. 7, the texture cache 221 and level 1 cache 231 in FIGS. 8-10, and the level 1 cache 222 and level 2 cache 232 in FIGS. 9 and 10 that perform the operations described in this application are implemented by hardware components configured to perform the operations described in this application that are performed by the hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 2, 4-6 and 11 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A control device for cache bypass, the control device comprising:
   one or more processors configured to:
      acquire information about pixels on a screen space and a texture to be mapped to the pixels, wherein the acquired information indicates a state in which a mipmap is not prepared,
      determine a scale factor, by using the acquired information, and
      control texture data corresponding to the texture to bypass a cache based on the scale factor, in response to the acquired information indicating the state in which the mipmap is not prepared,
   wherein the scale factor comprises a ratio of a size of the texture to a size of the pixels.

2. The control device of claim 1, wherein the one or more processors are configured to control the texture data to bypass the cache, in response to the scale factor being determined to be equal to or greater than a critical value by comparing the scale factor to the critical value.

3. The control device of claim 1, wherein, the one or more processors are configured to, in response to the scale factor being determined to be less than a critical value by comparing the scale factor to the critical value:
   set a counter in each cache line among cache lines in the cache; and
   determine, through a value of the counter, a cache line in which stored texture data is to be replaced.

4. The control device of claim 1, wherein the cache comprises one or any combination of two or more of a texture cache, a level 1 cache, and a level 2 cache.

5. The control device of claim 1, wherein the one or more processors are configured to acquire the information about the pixels on the screen space and the texture to be mapped to the pixels from one of a device driver and a texture processor.

6. A graphics processing unit (GPU) comprising:
   an upper level cache;
   a lower level cache;
   one or more processors configured to:
      acquire information about pixels on a screen space and a texture to be mapped to the pixels, wherein the acquired information indicates a state in which a mipmap is not prepared,
      determine a scale factor, by using the acquired information, and
      control texture data transmitted from the lower level cache to bypass the upper level cache based on the scale factor in response to the acquired information indicating the state in which the mipmap is not prepared; and
   a texture processor configured to process the texture data, wherein the scale factor comprises a ratio of a size of a texture to be mapped to pixels on a screen space to a size of the pixels.

7. The GPU of claim 6, wherein the one or more processors are configured to control the texture data to bypass the upper level cache, in response to the scale factor being determined to be equal to or greater than a critical value by comparing the scale factor to the critical value.

8. The GPU of claim 6, wherein the one or more processor is included in one of the upper level cache and the texture processor.

9. The GPU of claim 6, wherein the one or more processors are configured to:
control a request for the texture data to be directly transmitted to the lower level cache from the texture processor; and
control the texture data to bypass the upper level cache when the texture data is transmitted from the lower level cache, in response to the request.

10. The GPU of claim 6, wherein the upper level cache comprises one or both of a texture cache and a level 1 cache, and the lower level cache is a level 2 cache.

11. A method of controlling cache bypass, the method comprising:
acquiring information about pixels on a screen space and a texture to be mapped to the pixels, wherein the acquired information indicate a state in which a mipmap is not prepared;
determining a scale factor by using the acquired information; and
controlling texture data to bypass a cache based on the scale factor, in response to the acquired information indicating the state in which the mipmap is not prepared,
wherein the scale factor comprises a ratio of a size of the texture to a size of the pixels.

12. The method of claim 11, wherein the controlling of the texture data comprises:
controlling the texture data to bypass the cache, in response to the scale factor being determined to be equal to or greater than a critical value by comparing the scale factor to the critical value.

13. The method of claim 11, further comprising, in response to the scale factor being determined to be less than a critical value by comparing the scale factor to the critical value:
setting a counter in each cache line among cache lines in the cache; and
determining, through a value of the counter, a cache line, among the cache lines, in which stored texture data is to be replaced.

14. The method of claim 11, wherein the cache comprises one or any combination of two or more of a texture cache, a level 1 cache, and a level 2 cache.

15. The method of claim 11, wherein the acquiring of the information comprises acquiring the information from a device driver or a texture processor.

16. A non-transitory computer-readable medium storing instructions that, when executed by one or more processors, cause the one or more processors to perform the method of claim 11.

* * * * *